(12) United States Patent
Moore et al.

(10) Patent No.: US 7,673,233 B2
(45) Date of Patent: Mar. 2, 2010

(54) BROWSER TAB MANAGEMENT

(75) Inventors: Jason F. Moore, Redmond, WA (US);
Justin Mann, Redmond, WA (US);
Martijn Eldert Van Tilburg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1210 days.

(21) Appl. No.: 11/222,424

(22) Filed: Sep. 8, 2005

(65) Prior Publication Data
US 2007/0067733 A1    Mar. 22, 2007

(51) Int. Cl.
*G06F 17/00* (2006.01)
(52) U.S. Cl. ..................... 715/246; 715/243
(58) Field of Classification Search .......... 715/246
See application file for complete search history.

(56) References Cited

U.S. PATENT DOCUMENTS

| | | | |
|---|---|---|---|
| 6,212,541 B1 * | 4/2001 | McAuliffe et al. | 718/100 |
| 6,433,801 B1 | 8/2002 | Moon et al. | |
| 6,801,227 B2 | 10/2004 | Bocionek et al. | |
| 2002/0054123 A1 | 5/2002 | Walden et al. | |
| 2002/0059395 A1 | 5/2002 | Liou | |
| 2004/0212640 A1 | 10/2004 | Mann et al. | |
| 2005/0015726 A1 | 1/2005 | Tuominen | |
| 2005/0091225 A1 | 4/2005 | McKee et al. | |
| 2005/0144093 A1 * | 6/2005 | Kassan | 705/27 |
| 2006/0218500 A1 * | 9/2006 | Sauve et al. | 715/767 |
| 2006/0224967 A1 * | 10/2006 | Marmaros | 715/738 |
| 2006/0271858 A1 * | 11/2006 | Yolleck et al. | 715/738 |

FOREIGN PATENT DOCUMENTS

GB   2360921   10/2001

OTHER PUBLICATIONS

Web Archive Safari Website from Dec. 2004 http://web.archive.org/web/20041204044043/www.apple.com/safari/.*
Web Archive Safari Website May 2005 http://web.archive.org/web/20050527222050/www.apple.com/macosx/features/safari.*
"Maxthon Tabbed Browser", Available at http://www.maxthon.com, Accessed Sep. 7, 2005, 3 pages.
"iNetadviser; iNetAdviser Allows Opening Multiple Web Pages at a Time, Without Eating up the Valuable Windows Taskbar Space", Available at http://www.offliner.com/site/en/features/multibrowsing.html, Accessed Sep. 7, 2005, 2 pages.

(Continued)

*Primary Examiner*—Joshua D Campbell
*Assistant Examiner*—Christopher Bryant
(74) *Attorney, Agent, or Firm*—Lee & Hayes, PLLC

(57) ABSTRACT

The management of tabs in browser applications may be at least partially automated. In a described implementation, a link present in browser content information may include a link property indicating that the new browser content information targeted by the link is to be opened in a new tab. A browser application can therefore automatically launch a new tab without a user request. In another described implementation, a new travelogue created for a new tab may be initially populated with an historical entry that points to spawning browser content information and identifies the originating tab. When a user attempts to move backward from an initial page of the new tab, a browser application can therefore automatically redisplay the spawning browser content information at the originating tab.

4 Claims, 6 Drawing Sheets

OTHER PUBLICATIONS

"Mozilla; Tabbed Browsing in Action", Available at http://www.mozilla.org/products/firefox/tabbed-browsing, Accessed Sep. 7, 2005, 3 pages.

"Acoo Browser", Available at http://www.acoobrowser.com/, Accessed Sep. 7, 2005, 3 pages.

"Am Browser; Enhance Your Web Browsing Experience!", Available at http://www.ambrowser.com/, Accessed Sep. 7, 2005, 2 pages.

"Avant Browser", Available at http://www.avantbrowser.com/index.html, Accessed Sep. 7, 2005, 2 pages.

"Deepnet Explorer; 2. Tabbed Browsing & Group Tabs", Available at http://www.deepnetexplorer.com, Accessed Sep. 7, 2005, 1 page.

* cited by examiner

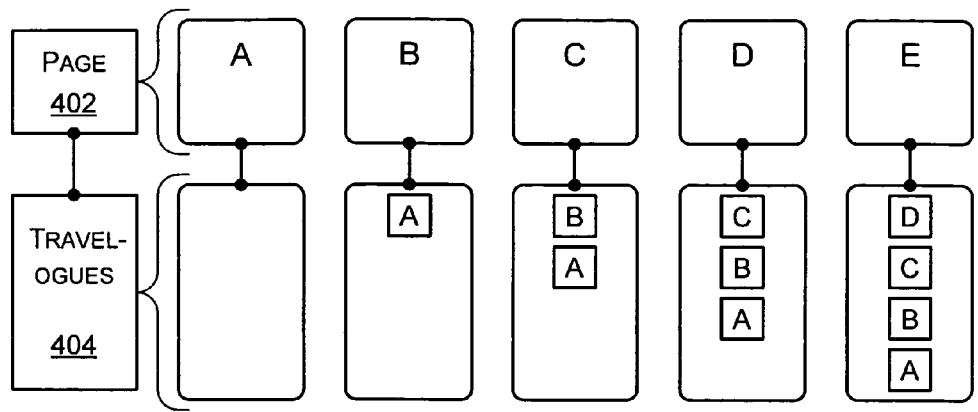
FIG. 4(A)  NO TAB
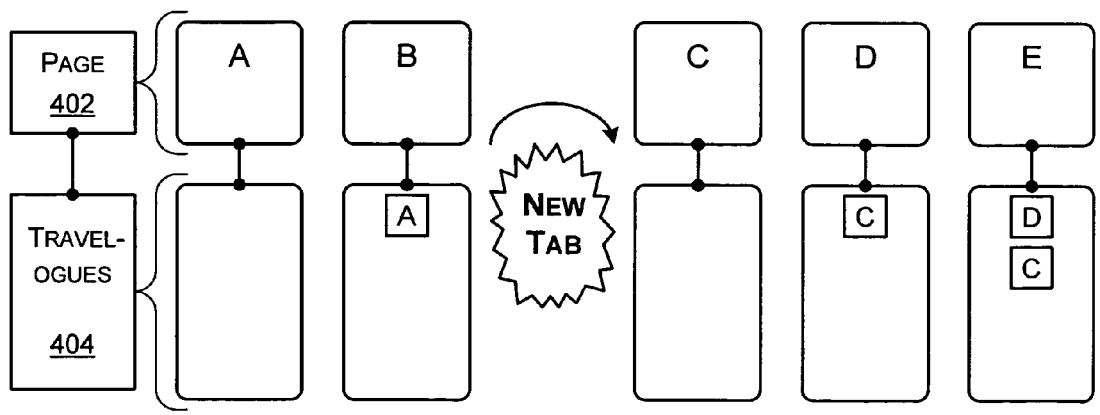
FIG. 4(B)  USER-CREATED TAB

BROWSER TAB MANAGEMENT

BACKGROUND

Application windows, including windows for browser applications, are typically managed by an operating system (OS) in graphical user interface (GUI) environments. Traditionally, each page of browser content information is represented by and accessible via a link on one or more other pages. When a user selects a link on a given page, the browser application retrieves the selected page and displays it in place of the given page in the browser application window.

Recently, tabbed browsing has been developed. Tabs are used in browser applications to enable multiple pages to be simultaneously opened within a single browser application window. The user is empowered to open a new tab within a browser application window. Consequently, the new tab may be used to display a new page of browser content information without overwriting the existing browser content information already displayed in a current tab.

SUMMARY

The management of tabs in browser applications may be at least partially automated. In a described implementation, a link present in browser content information may include a link property indicating that the new browser content information targeted by the link is to be opened in a new tab. A browser application can therefore automatically launch a new tab without a user request. In another described implementation, a new travelogue created for a new tab may be initially populated with an historical entry that points to spawning browser content information and identifies the originating tab. When a user attempts to move backward from an initial page of the new tab, a browser application can therefore automatically redisplay the spawning browser content information at the originating tab.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

FIG. 4(A) illustrates an approach to browser travelogues in a no tab scenario.

FIG. 4(B) illustrates an approach to browser travelogues in a user-created tab scenario.

DETAILED DESCRIPTION

Figure 1:
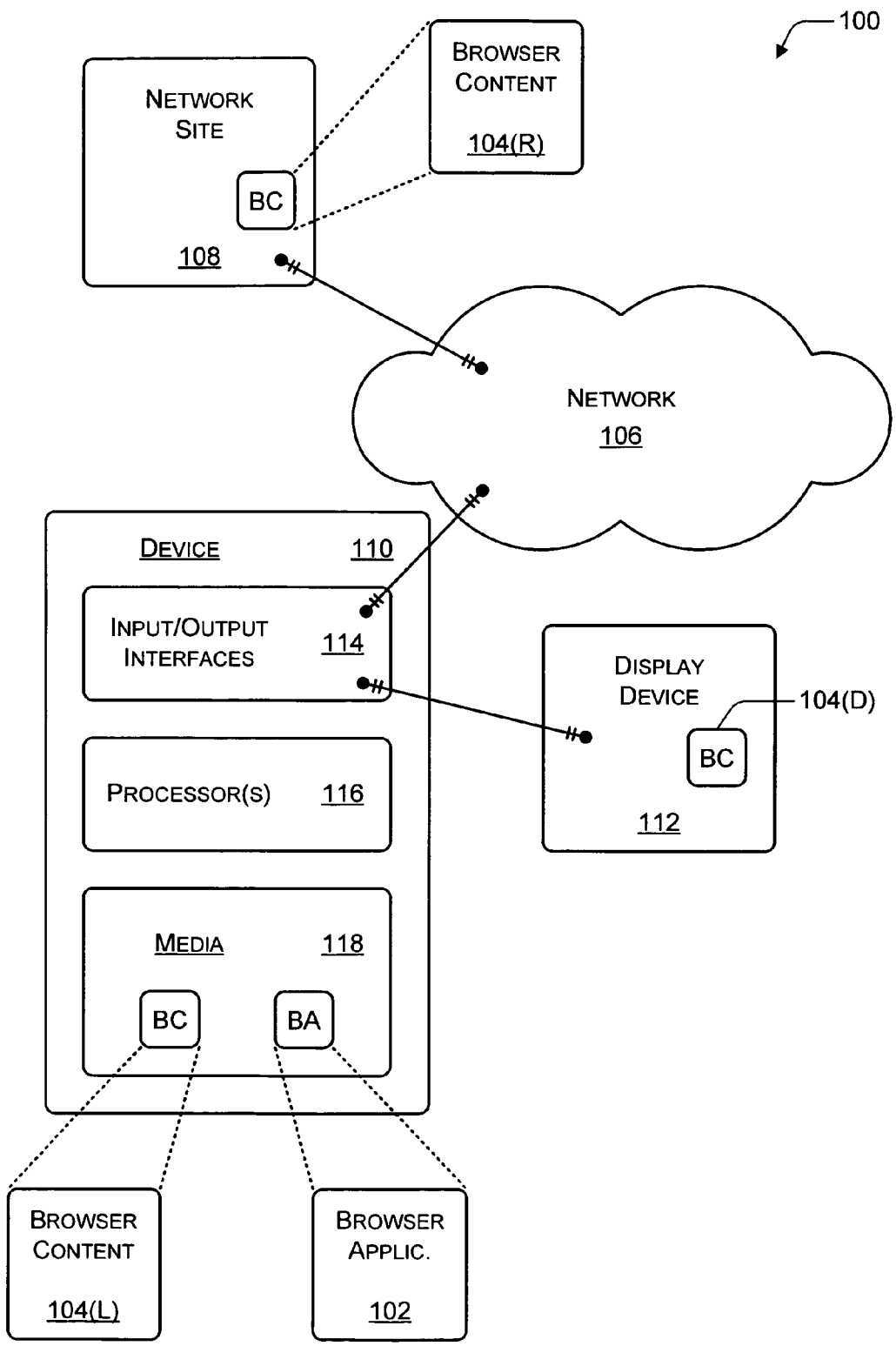
FIG. 1 is a block diagram illustrating a general example environment in which a browser application may operate to provide browser content to a user.

FIG. 1 is a block diagram illustrating a general example environment 100 in which a browser application 102 may operate to provide browser content 104 to a user. As illustrated, example environment 100 includes a network 106 and a network site 108. By way of example only, network 106 may be the internet, an intranet, some other public or private network, some combination thereof, and so forth. Network site 108 may be a private corporate server, a web site, a public commercial server, and so forth. Network site 108 includes remote browser content 104(R).

Environment 100 also includes a processing device 110 and a display device 112. By way of example only, processing device 110 may be a computer, a set-top box/cable device, a wireless device (e.g., a mobile phone or a personal digital assistant (PDA)), a gaming device, and so forth. Also, display device 112 may be a monitor, a separate or integrated screen, a projector, a printer, and so forth. As illustrated, device 110 includes one or more input/output (I/O) interfaces 114, at least one processor 116, and one or more media 118. Although not specifically illustrated, device 110 may also include other components.

In a described implementation, I/O interfaces 114 include a network interface (e.g., a network card and/or a modem) for communicating with network site 108 via network 106 and a display device interface (e.g., a graphics driver and/or a graphics card) for providing browser content 104(D) to display device 112. Processor 116 is capable of executing, performing, and/or otherwise effectuating processor-executable instructions. Media 118 is comprised of one or more processor-accessible media. In other words, media 118 may include processor-executable instructions that are executable by processor 116 to effectuate the performance of functions by device 110.

Thus, realizations for browser tab management may be described in the general context of processor-executable instructions. Generally, processor-executable instructions include routines, programs, coding, modules, protocols, objects, interfaces, components, metadata and definitions thereof, data structures, etc. that perform and/or enable particular tasks and/or implement particular abstract data types. Processor-executable instructions may be located in separate storage media, executed by different processors, and/or propagated over or extant on various transmission media.

Processor(s) 116 may be implemented using any applicable processing-capable technology. Media 118 may be any available media that is accessible by device 110. It includes volatile and non-volatile media, removable and non-removable media, and storage and transmission media (e.g., wireless or wired communication channels). Media 118 comprises local browser content 104(L) and browser application 102.

Browser content 104(R) and 104(L), which are displayed as browser content 104(D), may be any of many different types of information. Examples of such information include: a web page, a file (e.g., a word processing document, a general public document, a multi-media file, etc.), a hypertext markup language (HTML) document, and so forth. By way of example only, a "page" may be a representation of N commands, N sets of items, and/or N visualizations/views on top of all of them. Examples of pages include a webpage, a folder being browsed on a hard drive, a video game, and so forth.

Thus, browser content 104 may include text, images, icons, audio and/or visual material, metadata, some combination thereof, and so forth.

Browser application 102 may be any application that is capable of providing, retrieving, presenting, etc. browser content 104. An example of a browser application 102 is Microsoft Internet Explorer® from Microsoft® Corporation of Redmond, Wash. In operation, browser application 102 is capable of retrieving remote browser content 104(R) and/or local browser content 104(L) from network site 108 and/or media 118, respectively.

Figure 2:
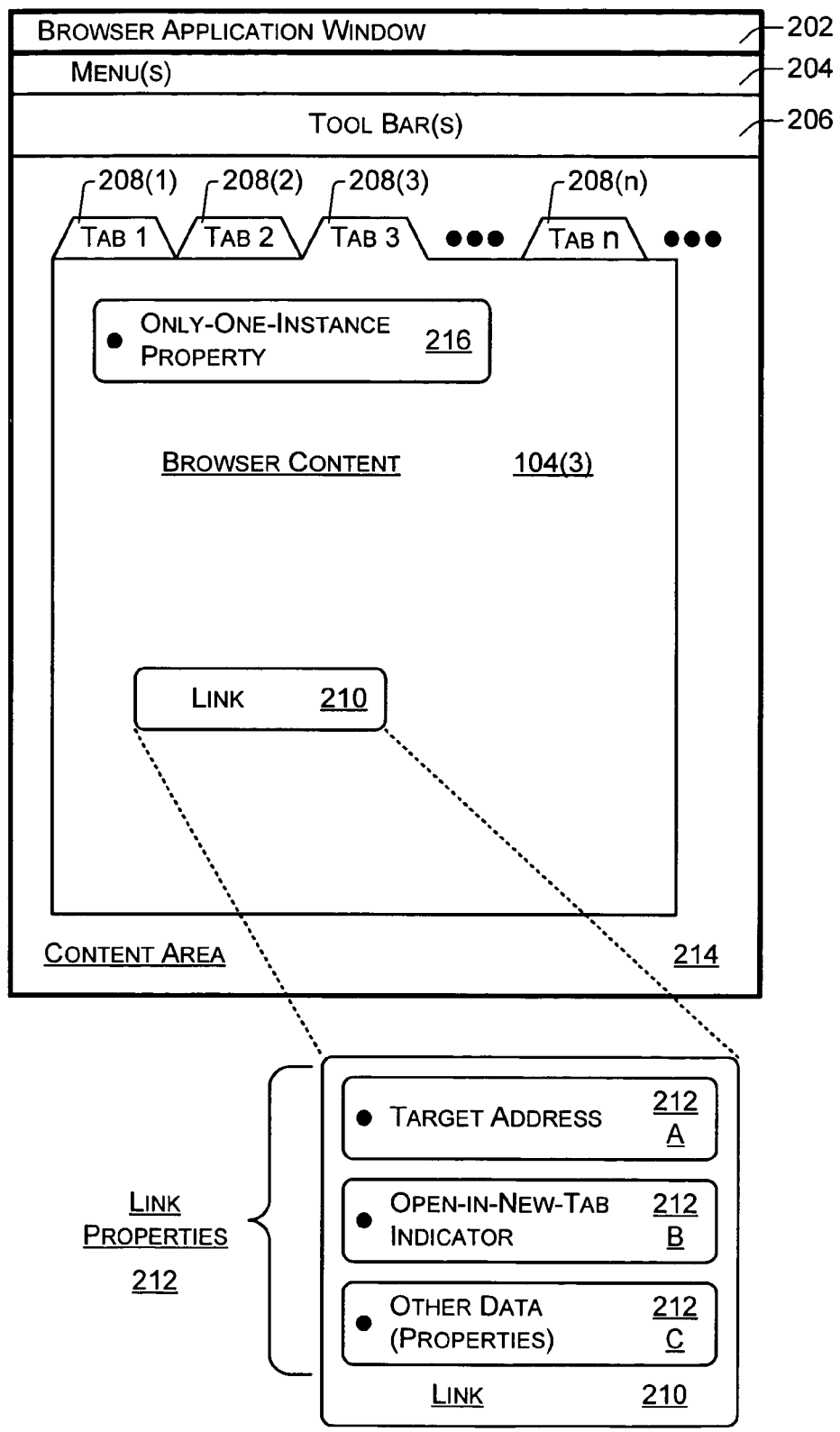
FIG. 2 illustrates a browser application window displaying browser content in a tabbed format.

FIG. 2 illustrates a browser application window 202 displaying browser content 104 in a tabbed format. When executing, browser application 102 (of FIG. 1) generates a browser application window 202. As illustrated, browser application window 202 includes menu(s) 204 and tool bar(s) 206. However, browser application window 202 may alternatively be arranged differently (e.g., with additional or fewer window items, in a different layout, etc.). Browser application window 202 also includes a content area 214.

Content area 214 includes one or more tabs 208. As illustrated, multiple tabs 208 are included as part of content area 214. Specifically, "n" tabs 208(1), 208(2), 208(3) . . . 208(n) are illustrated. However, none, one, or multiple tabs 208 may be in use by a browser application 102 within a content area 214 at any given moment.

Generally, each respective tab 208(n) includes (e.g., displays, corresponds to, etc.) respective browser content information 104(n). Tab 3 208(3), which is "on top" or on the top layer and therefore visible, includes browser content 104(3). Thus, although not specifically illustrated, tab 1 208(1) includes browser content 104(1), tab 2 208(2) includes browser content 104(2), and tab n 208(n) includes browser content 104(n).

As illustrated, browser content 104(3) includes a link 210. Link 210 may be visually represented in tab 3 208(3) as part of browser content 104(3) to a user as text, as an icon, as an image, as an animation, as some combination thereof, and so forth. Link 210 includes/is associated with at least one link property 212. Example link properties 212 include a target address 212A, an open-in-new-tab indicator 212B, and other data 212C. Link properties 212 are not usually visible to the user, but they are present in browser content 104(3) and accessible to browser application 102.

Target address 212A is the locator (e.g., network, memory, and/or drive address) of the browser content that is targeted by link 210. For example, target address 212A may be an internet protocol (IP) address, a uniform resource locator (URL), and so forth. Open-in-new-tab indicator 212B is an indication to browser application 102 that the browser content targeted by link 210 is to be opened within a new tab 208. Hence, if an open-in-new-tab indicator 212B is present as a link property 212 of link 210, browser application 102 opens a new tab 208 (e.g., a tab 208(n+1) (not shown)), locates the new tab 208(n+1) on top, and loads the targeted browser content in the new tab 208(n+1). Link properties 212 may also optionally include other data properties as indicated by the link property entry other data 212C.

Browser content 104(3) of tab 3 208(3) also includes an only-one-instance property 216. Only-one-instance property 216 may be, for example, a page-type property for a web page. However, only-one-instance property 216 may alternatively be realized differently. An only-one-instance property 216 may be relevant when multiple versions of browser content 104 might cause the user confusion, when multiple versions of browser content 104 is inherently nonsensical, when multiple versions of browser content 104 may result in the activation or ratification of multiple instances of a commercial or financial transaction that is intended to be executed once, and so forth.

Generally, such a browser content property as only-one-instance property 216 is not readily visible to a viewing user. Alternatively, only-one-instance property 216 may be made visible to a user as text, as an icon, as an image, and so forth. Such a visible indication may be included as part of content area 214 (e.g., within tab 3 208(3) as part of browser content 104(3)), as part of browser application window 202, and so forth.

Alternative embodiments for only-one-instance property 216 may be implemented. For example, only-one-instance property 216 may be automatically limited to a single browser application window 202. In other words, the existence of an only-one-instance property 216 in browser content 104 may only prevent a duplicate version of the browser content 104 from being loaded into the browser application window 202 that already includes a version of the browser content 104. Thus, in this example, a duplicate version of the browser content 104 having an only-one-instance property 216 may still be loaded into a different browser application window 202. Generally, an only-one-instance property 216 associated with browser content 104 may by default be applied universally across all open browser application windows 202 or may by default be limited to only individual browser application windows 202.

As another alternative, each only-one-instance property 216 may affirmatively indicate whether the only-one-instance effect is to be applied across multiple (including all) browser application windows 202 or be limited to only each single browser application window 202. In other words, an only-one-instance property 216 may indicate that the corresponding browser content 104 is limited to only one tab for all browser application windows 202 or only limited to one tab within each browser application window 202.

Figure 3:
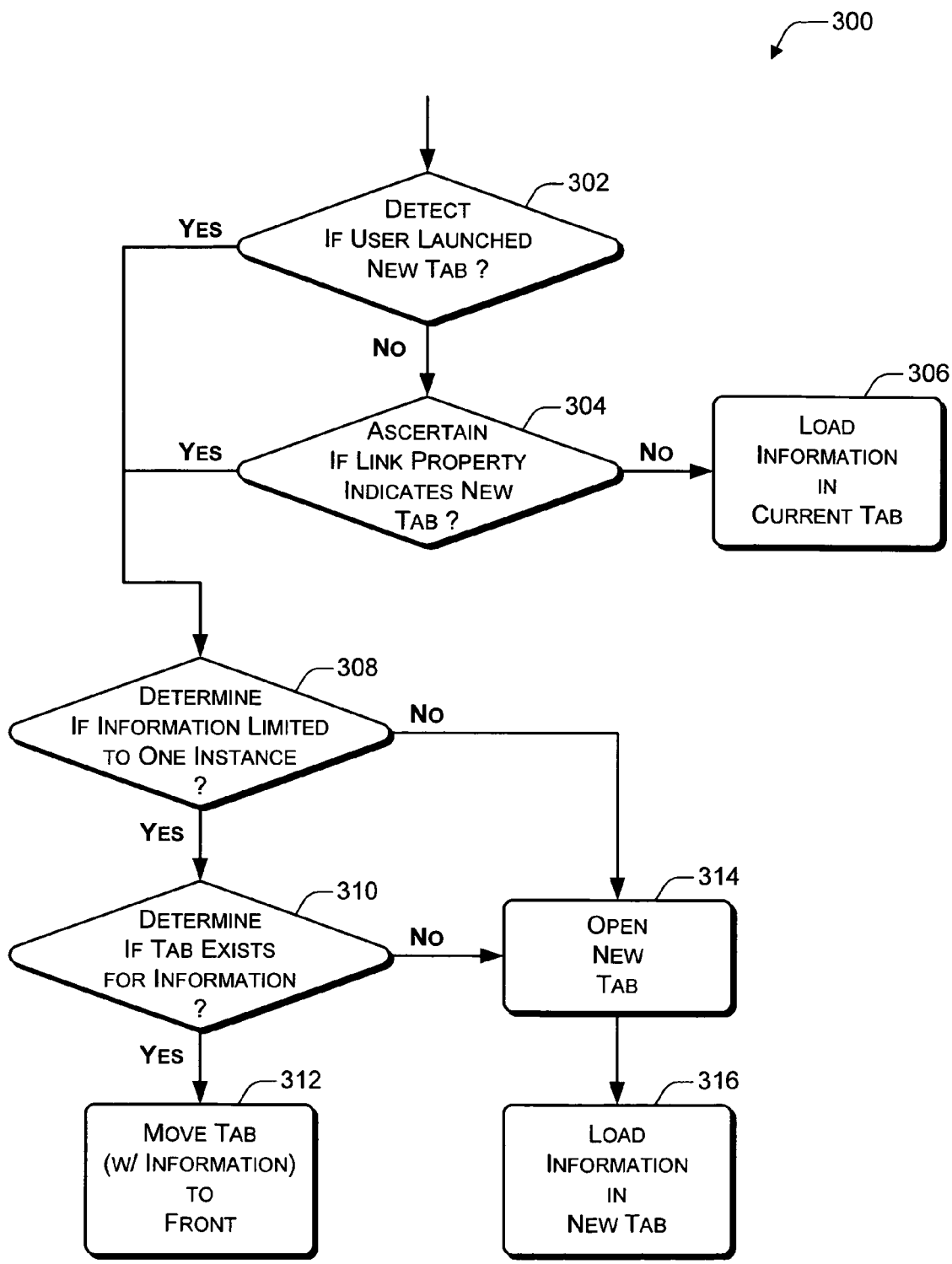
FIG. 3 is a flow diagram that illustrates an example of a first method for managing browser tabs.

FIG. 3 is a flow diagram 300 that illustrates an example of a first method for managing browser tabs. Flow diagram 300 includes eight (8) blocks 302-316. Although the actions of flow diagram 300 may be performed in other environments and with a variety of hardware and software combinations, FIGS. 1 and 2 are used in particular to illustrate certain aspects and examples of the method.

By way of example only, the actions of flow diagram 300 may be performed by a browser application 102 in the context of browser content 104(3). Performance of the actions by browser application 102 may be facilitated by interaction with an OS of device 110. Flow diagram 300 may begin when a user activates a link (e.g., link 210).

At block 302, it is detected if a user launched a new tab. For example, it may be detected that a user actively launched a new tab by inputting a "new tab" instruction with respect to an activated link. Such a new tab instruction may be activated, for example, by clicking an icon of tool bar 206, by typing a keyboard command, by right-clicking on link 210 and selecting an "open in new tab" option, and so forth. If the user launched a new tab, then flow diagram 300 continues at block 308.

Otherwise, at block 304, it is ascertained if a link property of the activated link indicates that a new tab is to be opened. For example, it may be ascertained if link 210 includes an open-in-new-tab indicator 212B. If not, then at block 306 the targeted browser content 104 is loaded into a current tab. If, on the other hand, a link property exists indicating that a new tab is to be opened, then flow diagram 300 continues at block 308.

At block 308, it is determined if the browser content information targeted by the activated link is limited to one instance. For example, it may be determined if targeted browser content information 104 has an only-one-instance property 216. If not, then flow diagram 300 continues at block 314. As described herein above, targeted browser content information 104 may be a page or any other type or kind of information that is displayable, accessible, and/or otherwise compatible with a browser application 102.

Otherwise, at block 310 it is determined if a tab already exists for the information. For example, it may be determined if the targeted browser content information 104 already exists in another tab 208. If so, then at block 312 the tab with the targeted information is moved to the front. For example, if the targeted browser content information 104 is located at tab 2 208(2), then browser application 102 may move tab 2 208(2) to the front layer of content area 214. If, on the other hand, the targeted information does not already exist in another tab, then flow diagram 300 continues at block 314.

At block 314, a new tab is opened. For example, browser application 102 may create a new tab 208(n+1) (not shown) and locate it on top of other tabs 208(1 . . . n) within content area 214. At block 316, the targeted information is loaded into the new tab. For example, the targeted browser content information 104 may be retrieved from a network site 108 or from media 118 and displayed within new tab 208(n+1) on display device 112.

Browser applications 102 often track histories of the browser content 104 that is accessed by users via the browser applications 102. A history, depending on a user's order of requesting browser content 104, can be both forward and backward. The history is maintained or stored as a travelogue. For each item of browser content information 104, an entry is typically added to the travelogue.

FIG. 4(A) illustrates an approach to browser travelogues in a no tab scenario. Multiple pages 402 and multiple travelogues 404 are shown. Generally, each respective page 402 corresponds to a respective travelogue 404 as indicated by the connecting lines that are terminated with small circles. Specifically, five pages 402, which are designated by the letters A-E are shown. Each respective page 402 A, B, C, D, and E corresponds to a respective travelogue 404.

In FIG. 4(A), no tabs 208 (of FIG. 2) are being employed by a browser application 102. Initially, in a described implementation, page A is loaded upon a new browser application window 202 being opened, and the corresponding travelogue is empty. In a real-world situation, the page A travelogue is empty with respect to historical entries; however, it may initially contain other data.

After a user requests a page B, page B is loaded into browser application 102. An entry directed to page A is added to the travelogue corresponding to page B. The entry may, for example, include a pointer to page A. The pointer may be a target address, a location of a cached version of page A, and so forth. The entry may also include other data for page A, such as data entered into a form by a user.

In the example scenario of FIG. 4(A), the user continues to progress forward by requesting pages C, D, and E. When page C is loaded, an entry directed to page B is added to the travelogue corresponding to page C. When page D is loaded, an entry directed to page C is added to the travelogue corresponding to page D. When page E is loaded, an entry directed to page D is added to the travelogue corresponding to page E. If a user were to move backward from page E to page D, the travelogue corresponding to page D then typically includes a forward entry directed to page E added thereto.

FIG. 4(B) illustrates an approach to browser travelogues in a user-created tab scenario. Initially, page A is loaded into a browser application window 202 by browser application 102 upon it being started, and the corresponding travelogue is empty. Page A may be a home page or another initially-designated page. When page B is loaded in response to a user request, an entry directed to page A is added to the travelogue corresponding to page B.

In the example scenario of FIG. 4(B), when a user requests that page C be retrieved and loaded, the user instructs that page C be loaded in a new tab 208. In this scenario, a new travelogue is created for the new tab 208. The new travelogue corresponding to page C in the new tab 208 is empty. It does not include historical data from the old tab or historical data to identify the old tab. Consequently, the user cannot move backward from the new tab 208 that holds page C to the old tab 208 or otherwise to page B. (The user can, however, still manually switch to the old tab 208 or otherwise manually input or elect to load page B into the new tab 208.)

The user continues to progress forward by requesting pages D and E. When page D is loaded, an entry directed to page C is added to the travelogue corresponding to page D. When page E is loaded, an entry directed to page D is added to the travelogue corresponding to page E. Thus, the travelogue corresponding to page E includes two entries: one directed to page D and another directed to page C.

Thus, a user is automatically empowered by browser application 102 to back up to page C within the new tab 208 using the travelogues 404. However, no additional backing up beyond page C is automatically enabled by browser application 102 in the scenario of FIG. 4(B).

To clarify, the illustrations of FIGS. 4(A) and 4(B) are not intended to indicate the simultaneous existence of separate travelogues 404 corresponding to each and every one of the different pages 402. On the contrary, the figures indicate a temporal progression of different states of one or two travelogues 404. For the scenario of FIG. 4(A), there is one travelogue 404 having five different states corresponding to pages A-E. For the scenario of FIG. 4(B), there are two travelogues 404 that may simultaneously exist. There is a first travelogue 404 for the old/original tab that has two different states corresponding to pages A and B. There is also a second travelogue 404 for the new tab that has three different states corresponding to pages C, D, and E.

Figure 4C:
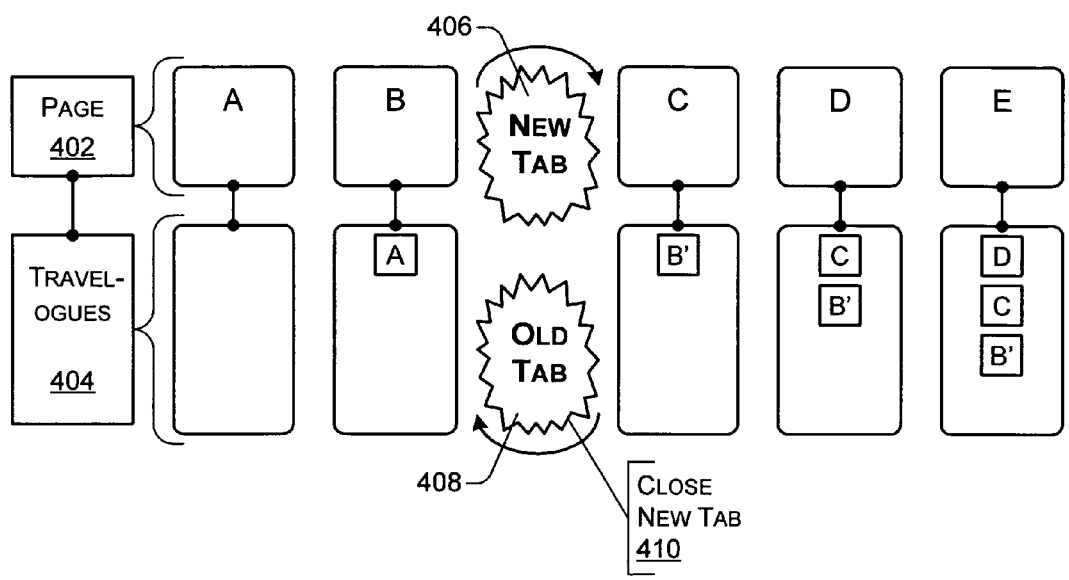
FIG. 4(C) illustrates an approach to browser travelogues in an application-created tab scenario.

FIG. 4(C) illustrates an approach to browser travelogues in an application-created tab scenario. In this scenario, browser application 102 creates a new tab 208 without manual instruction from the user. Initially, page A is loaded by browser application 102 in an original or old tab, and the corresponding travelogue is empty of historical entries. Page B is next requested by selecting a link 210, by manually inputting a known target address 212A, and so forth. When page B is loaded in the original/old tab, an entry directed to page A is added to the travelogue corresponding to page B.

In the example scenario of FIG. 4(C), when a user requests that page C be retrieved and loaded, browser application 102 causes page C be loaded in a new tab 208, as indicated at 406. Browser application 102 may cause page C to be loaded into a new tab for any one or more of many possible triggers. For example, a link 210 that is selected by the user and that targets page C may include an open-in-new-tab indicator 212B in its link properties 212. This trigger is described herein above with particular reference to FIGS. 2 and 3. Alternatively, there may be other triggers.

After the new tab 208 is created as indicated at 406, page C is loaded in the new tab 208, and a new travelogue is initialized to correspond to page C. In this travelogue corresponding to page C, an entry directed to page B' is added. The B' historical entry differs from other historical entries as described herein above with regard to FIGS. 4(A) and 4(B) as indicated by the apostrophe ('). The B' historical entry, in addition to pointing to page B, identifies the original/old tab from which the new tab is being spawned. This creates an association between the old tab and the new tab. The identification of the old tab also empowers a user to back up to page B at the old tab.

The user continues to progress forward by requesting pages D and E. When page D is loaded, an entry directed to page C is added to the travelogue corresponding to page D. When page E is loaded, an entry directed to page D is added to the travelogue corresponding to page E. As a result, the travelogue corresponding to page E includes three entries: one directed to page D, one directed to page C, and one directed to page B' (which also identifies the old tab).

Thus, in the example scenario of FIG. 4(C), a user is empowered to back up to a page and an original tab that spawned an associated new tab. For example, a user is viewing page C in the new tab 208 of a browser application window 202. The user instructs browser application 102 to move backward. Browser application 102 references the travelogue corresponding to page C at the new tab and extracts the next backward entry. The next backward entry, B', points to page B and identifies the associated tab that spawned the new tab. This associated tab is the original/old tab.

Browser application 102 therefore relocates the old tab 208 on top of content area 214 of browser application window 202 as indicated at 408. This old tab displays page B. The travelogue for the old tab that corresponds to page B, in the example illustrated in FIG. 4(C), includes a backward entry directed to page A at the old tab.

In a described implementation, browser application 102 also closes the new tab as indicated at 410. This optional action facilitates a more complete automatic management of tabs. It is especially applicable when browser application 102 created the new tab without receiving an instruction from the user. Alternatively, the new tab may be permitted to continue to exist (e.g., with page C ready for display).

Although not specifically illustrated for the sake of clarity, the travelogue corresponding to page C can be equivalent to the illustrated travelogue for page E in certain circumstances. In other words, the new tab travelogue corresponding to page C may include three entries directed to page D, page C, and page B'/old tab. (It may actually also include an entry directed to page E for forward movement purposes.) This can occur, for example, after a user moves backward from page E to page C (e.g., by activating a backward button twice). Consequently, a user who has backed up to page C, instead of further backing up to page B at the old tab, can elect to move forward to page D at the new tab.

In the example scenario of FIG. 4(B) as described herein above, a user has actively requested that a page be opened in a new tab. In that scenario, the travelogue for the new tab is initially empty. However, user-created new tabs may be treated similarly to the scenario of FIG. 4(C). In other words, the travelogue for a user-created new tab can be initialized to point to the spawning page of the old tab.

Figure 5:
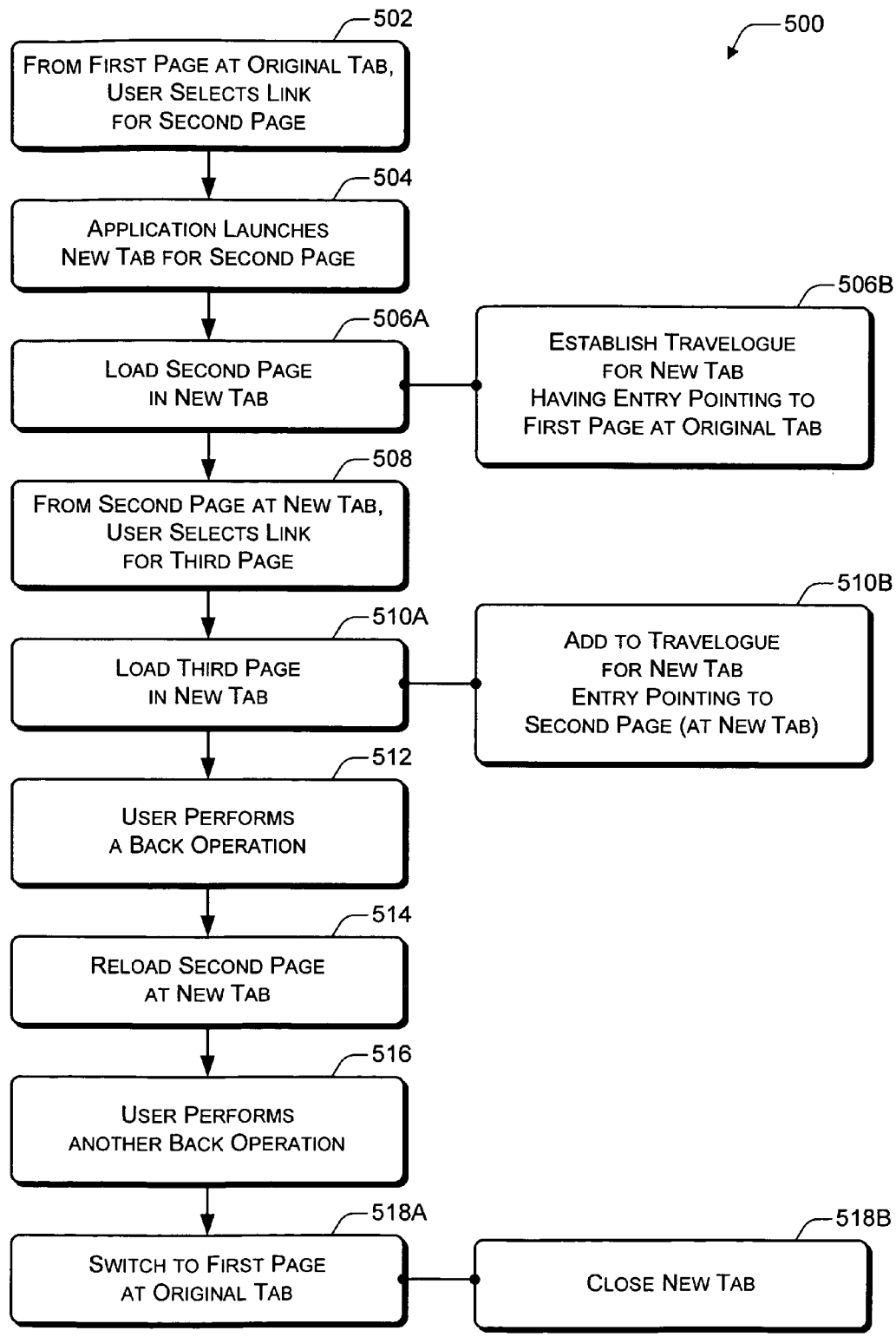
FIG. 5 is a flow diagram that illustrates an example of a second method for managing browser tabs.

FIG. 5 is a flow diagram 500 that illustrates an example of a second method for managing browser tabs. Flow diagram 500 includes twelve (12) blocks 502-518, including blocks 506A/B, 510A/B, 518A/B. Although the actions of flow diagram 500 may be performed in other environments and with a variety of hardware and software combinations, FIGS. 1, 2, and 4(C) are used in particular to illustrate certain aspects and examples of the method.

At block 502, a user selects a link for a second page from a first page at an original tab. For example, from page B (of FIG. 4(C)) at an old tab 208(3) (of FIG. 2), a user may select a link 210 having a target address 212A of page C.

In this example of FIG. 5, browser application 102 determines that a new tab is to be opened. This determination may be based on any trigger, including manual ones. By way of example only, the trigger may be a manual open-in-new-tab request by a user, an open-in-new-tab indicator 212B link property 212 of the link 210 for page C, and so forth.

At block 504, the browser application launches a new tab for the second page. For example, browser application 102 may launch a new tab 208(n+1) (not shown) within browser application window 202 for page C as indicated at 406.

At block 506A, the second page is loaded into the new tab. For example, page C may be loaded into new tab 208(n+1) at the top layer of content area 214. At block 506B, a travelogue is established for the new tab with the travelogue having an entry pointing to the first page at the original tab. For example, a travelogue for new tab 208(n+1) corresponding to page C may be established with an entry pointing to page B and identifying the old tab 208(3).

At block 508, the user selects a link for a third page from the second page of the new tab. For example, from page C of the new tab 208(n+1), a user may select a link 210 having a target address 212A of page D.

At block 510A, the third page is loaded into the new tab. For example, page D may be loaded into new tab 208(n+1) in content area 214. At block 510B, a backward entry pointing to the second page (at the new tab) is added to the travelogue for the new tab. For example, the travelogue established for the new tab 208(n+1) and corresponding to page D may have added thereto an entry pointing to page C.

At block 512, the user performs a back operation. For example, the user may instruct browser application 102 to perform a move backward operation with regard to the displayed browser content information. At block 514, the second page is reloaded at the new tab. For example, browser application 102 may reload page C into the new tab 208(n+1). At block 516, the user performs another back operation.

At block 518A, the browser application switches to the first page at the original tab. For example, browser application 102 may switch the tab that is on top of content area 214 to the old tab 208(3), which still holds and displays page B, as indicated at 408. At block 518B, the new tab is closed. For example, browser application 102 may close new tab 208(n+1), as indicated at 410. As noted above, new tab 208(n+1) may alternatively be left open (e.g., as an underlying tab in content area 214).

The devices, actions, aspects, features, functions, procedures, modules, data structures, components, etc. of FIGS. 1-5 are illustrated in diagrams that are divided into multiple blocks. However, the order, interconnections, interrelationships, layout, etc. in which FIGS. 1-5 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for browser tab management.

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. One or more processor-accessible media comprising processor-executable instructions that, when executed by at least one processor, direct a device to perform actions comprising:

from a first page at an original tab in an internet browser, receiving user input to retrieve a second page;

launching a new tab for the second page in the internet browser;

in a travelogue for the new tab in the internet browser, including a historical entry pointing to the first page at the original tab in the internet browser;

from the second page at the new tab, receiving user input to perform a back operation;

switching to the first page at the original tab responsive to the user input to perform a back operation; and closing the new tab responsive to the user input to perform a back operation from the second page at the new tab;

wherein the switching action is further performed responsive to the historical entry pointing to the first page at the original tab; and wherein the traveloque for the new tab indicates which tabs precede and succeed the new tab.

2. The one or more processor-accessible media as recited in claim 1, wherein the launching is performed responsive to a manual user request for the new tab or responsive to an open-in-new-tab indicator link property for a selected link.

3. The one or more processor-accessible media as recited in claim 1, wherein the switching action is further performed responsive to the historical entry pointing to the first page at the original tab.

4. The one or more processor-accessible media as recited in claim 1, wherein the launching is performed responsive to a manual user request for the new tab or responsive to an open-in-new-tab indicator link property for a selected link.

* * * * *